Nov. 24, 1964  A. F. ARNOLD  3,158,096
STAMP ASSEMBLY
Filed Sept. 14, 1961

INVENTOR.
Arnold F. Arnold
BY
Roberts, Cushman & Grover
ATT'YS

United States Patent Office 3,158,096
Patented Nov. 24, 1964

3,158,096
STAMP ASSEMBLY
Arnold F. Arnold, Miller Place, N.Y., assignor to Parker
Brothers, Inc., Salem, Mass., a corporation of Maine
Filed Sept. 14, 1961, Ser. No. 138,013
2 Claims. (Cl. 101—368)

This invention relates to applicators and especially to hand stamps for applying marking compositions and has for its principal objects to provide a series of applicators, each of which is designed so that it can be used to make an imprint next to any one or more of the others, or over, or under, or over and under another to create designs, representations, pictures and the like, with basic or half-tone colors in varying degrees of shading. Further objects are to provide an applicator stamp which will produce a sharp image or imprint, is adapted for marking relatively porous surfaces, or the like, is durable, and can be manufactured economically.

As herein illustrated, there are twelve applicators of basic design which collectively provide for creating a composite design, characterized in that nine of the applicators are circumscribed by a circle of predetermined size and the remaining three are situated within and contain the center of said circle of predetermined size. All of the applicator surfaces are spherically convex with respect to a radius perpendicular to any tangent to the convex surface. Each applicator has a handle, the axis of which is perpendicular to the plane of the circle within which the surface is contained, and is comprised of a cylindrical part corresponding in diameter to the circle, mounting at its lower end the applicator surface and at its upper end a handle. Preferably the handle is separable from the cylindrical portion and has a cylindrical part which is frictionally engageable therewith. The applicators are made of plastic such as vinyls, polyethylenes, styrenes, cellulose, and the like.

The invention will now be described in greater detail with reference to the accompanying drawings wherein.

Figure 1:
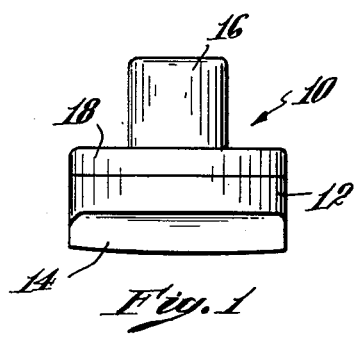
FIG. 1 is an elevation of an applicator.
Figure 2:
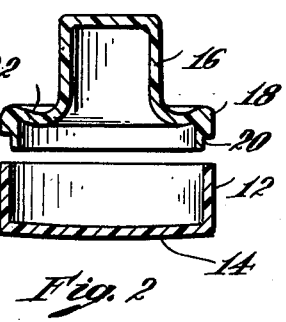
FIG. 2 is a vertical, diametrical section through the applicator, showing the handle separated from the applicator portion.
Figure 3:
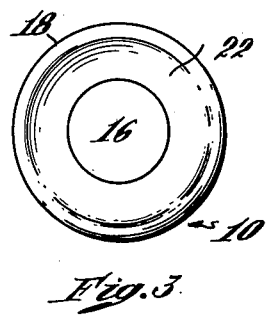
FIG. 3 is a plan view of FIG. 1.
Figure 5:
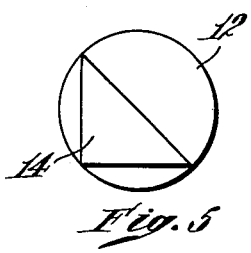
FIGS. 5 to 16 inclusive, show twelve basic shapes for the applicator surfaces.
Figure 6:
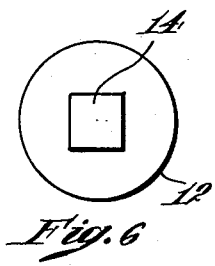
Figure 7:
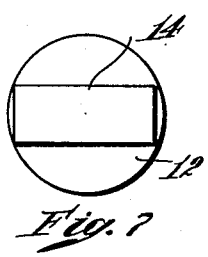
Figure 8:
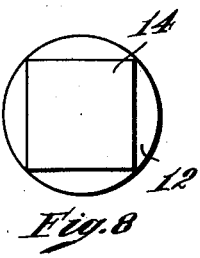
Figure 9:
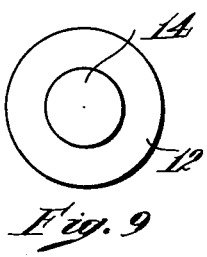
Figure 10:
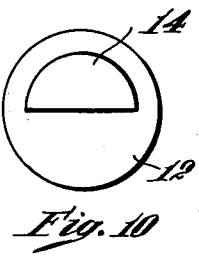
Figure 11:
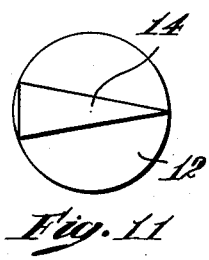
Figure 12:
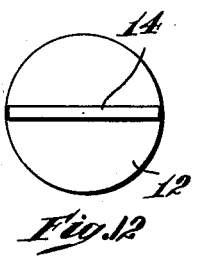
Figure 13:
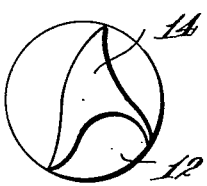
Figure 14:
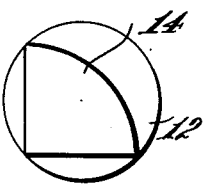
Figure 15:
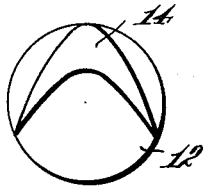
Figure 16:
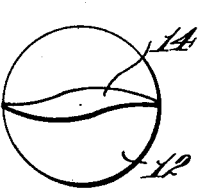
Figure 4:
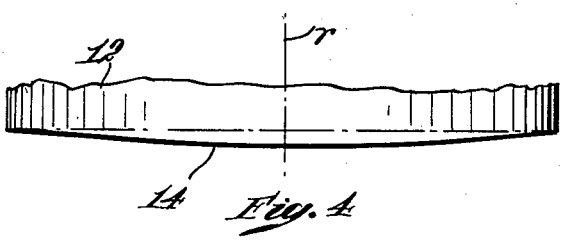
FIG. 4 is a very much enlarged fragmentary elevation showing the curvature of the applicator surface.

Referring to the drawings, FIGS. 1 to 3, each applicator 10 has a cup-shaped body 12 of cylindrical cross-section, the bottom of which has, in relief, a marking surface 14 of a specific basic shape or design. Twelve basic shapes are provided which, when used to make images next to each other or in varying degrees of overlapping or underlapping and to apply basic colors, collectively provide for creating a variety of patterns, designs, representations, and the like, in basic or half-tone colors. The several designs are shown in FIGS. 5 to 16 inclusive, and are characterized in that of the twelve, nine (FIGS. 5, 7, 8 and 11 to 16 inclusive) are circumscribed, that is, have two or more parts lying on the perimeter of a circle of predetermined size which corresponds to the diameter of the cylindrical body and the remaining three (FIGS. 6, 9 and 10) are situated within, that is, have no points lying on the perimeter and contain the center of the circle. Each of the relieved surfaces 14 is spherically convex as shown in FIG. 4, the curvature of the surface having its center on a radius $r$ which is perpendicular to the cross-section of the cylindrical base 12 and lies on the axis of the cylinder. The applicator surfaces 14 are sharply relieved so as to make sharp clear imprints.

Each of the applicators is provided with a handle 16 which has at its lower end a cylindrical base 18 corresponding in diameter to the body of the applicator. The edge of the base is rabbeted to provide a flange 20 for frictional engagement with the body to hold the handle and body together. Preferably an annular depression 22 is provided at the junction of the handle with the base 18 to afford a good finger hold.

The applicators are comprised of a plastic such as vinyl, polyethylene, styrene, cellulose, and the like. By making the handle separate from the body a substantial saving may be effected in mold costs.

The stamps illustrated are used with a conventional ink absorbent pad such as are usually contained in a flat metal receptacle provided with a cover for preventing excessive evaporation and from which ink may be taken up by pressing the stamp against the surface. It is contemplated for the purpose of this invention, that several such pads will be provided impregnated with basic colors. Preferably, although not necessarily, the applicators may be made in several colors, for example to correspond to the color of the ink which is to be used.

The curvature of the applicator surface is of considerable importance because it allows the applicator to be rolled slightly on the surface to which the ink is being applied and thus to insure a complete coverage of the surface and hence a perfect impression which would otherwise be practically impossible as it is notorious that flat surfaces leave voids. As a matter of fact, the convexity of the surface and sharp relief at the edges induces a somewhat involuntary rolling action on the part of the user so that well-defined impressions are assured.

It should be understood that the present disclosure is for the purpose of illustration only and that this invention includes all modifications and equivalents which fall within the scope of the appended claims.

I claim:

1. A hand stamp comprising a hollow cylindrical body of right-circular section closed at one end and open at the other, said closed end bearing, in relief, a geometric figure, the surface of which is spherically convex and said open end being bounded by a flat annular edge, and a cover including attaching means and a handle, said cover comprising a cylindrical body having an outside diameter corresponding to the outside diameter of the cylinder, said attaching means comprising an annular flange extending from one side of the body, said flange having an outside diameter corresponding to the inside diameter of the cylinder for frictional engagement therewith, providing an annular shoulder at the junction of the flange and the body for engagement with the edge of the cylinder, and said handle comprising a cylindrical stem of smaller diameter than the body projecting from the other side of the body, peripherally of which, at its junction with the body, is a concave annular depression.

2. A hand stamp comprising a hollow cylindrical body of right-circular section closed at one end and open at the other, said closed end bearing, in relief, a geometric figure, the surface of which is spherically convex, and said open end being bounded by a flat annular edge, a cover including attaching means and a handle, said cover comprising an annular body having an outside diameter corresponding to the outside diameter of the cylinder, said attaching means comprising an annular flange extending from one side of the annular body, said flange having an outside diameter corresponding to the inside diameter of the cylinder, providing an annular shoulder at the junction of the flange with the body engageable with the edge of the cylinder, and said handle comprising a hollow cylindrical stem of lesser diameter than the cylinder having a closed upper end and connected at its lower end to the annular body by an annular wall of convex cross-section providing an annular depression circumscribing the handle.

References Cited by the Examiner
UNITED STATES PATENTS

| | | | |
|---|---|---|---|
| 82,629 | 9/68 | Needham | 16—121 |
| 446,929 | 2/91 | Rockey | 101—398 |
| 1,178,147 | 4/16 | Gardner | 16—114 X |
| 1,607,660 | 11/26 | Zabriskie | 101—405 X |
| 2,312,782 | 3/43 | Thorell | 101—398 X |
| 2,664,820 | 1/54 | Brown | 101—405 |

ROBERT E. PULFREY, *Primary Examiner.*

ROBERT A. LEIGHEY, *Examiner.*